United States Patent

[11] 3,591,714

[72] Inventor Leslie Henry Guildford
Haywards Heath, Sussex, England
[21] Appl. No. 798,742
[22] Filed Feb. 12, 1969
[45] Patented July 6, 1971
[73] Assignee U.S. Philips Corporation
[32] Priority Feb. 15, 1968
[33] Great Britain
[31] 7,572/68

[54] ARRANGEMENTS FOR SAMPLING AND MULTIPLEXING ELECTRICAL SIGNALS
10 Claims, 8 Drawing Figs.

[52] U.S. Cl. .......... 178/6.8, 178/DIG. 8, 178/7.1, 250/211 J
[51] Int. Cl. .......... H04n 5/14
[50] Field of Search .......... 178/7.1, 7.2, 6, 6.8, 7.7; 250/211 J, 211 R; 313/108 B, 108 D

[56] References Cited
UNITED STATES PATENTS
3,067,283 12/1962 Petritz et al. .......... 178/6.8

*Primary Examiner*—Robert L. Richardson
*Attorney*—Frank R. Trifari

ABSTRACT: A circuit for sampling and multiplexing a plurality of amplitude modulated signals, particularly those from an array of infrared detectors features a plurality of time modulators, e.g. pulse position or pulse width modulators, for each of the signals. Then the signals are multiplexed together. Each of the time modulators are controlled by a sampling waveform generator which can have a variety of sweeps, such as, linear, exponential or reduced linear, to result in various types of amplitude compression.

PATENTED JUL 6 1971 3,591,714

SHEET 1 OF 5

INVENTOR.

LESLIE H. GUILDFORD

BY Frank R. Trifari AGENT

EFFECT OF LINEAR & EXPONENTIAL SAMPLING SWEEPS

INVENTOR
LESLIE H. GUILDFORD
BY Frank R. Trifari
AGENT

INVENTOR.
LESLIE H. GUILDFORD
BY Frank R. Trifari
AGENT

TUNNEL DIODE I/V CURVE

INVENTOR.
LESLIE H. GUILDFORD
BY
[signature]
AGENT

INVENTOR.

LESLIE H. GUILDFORD

BY Frank R. Trifari

AGENT

ARRANGEMENTS FOR SAMPLING AND MULTIPLEXING ELECTRICAL SIGNALS

This invention relates to arrangements for sampling and multiplexing electrical signals and has a particular but nonexclusive application to infrared thermal imaging systems.

In one kind of system for producing the thermal image of a scene, the scene is scanned optically with a line array of infrared detector cells, the output of each cell is sampled by means of a high speed sampling switch, and the sampled outputs are multiplexed into a video waveform which is utilized to reconstitute an image of the scene on a television monitor. The frame scan of the monitor is locked to that of an infrared optical scanner used in conjunction with the line array of infrared detector cells to scan the scene, and the line time base of the monitor is synchronized with the sampling switch. Thus, as the line array of infrared detector cells is swept optically across the scene, the sampling switch connects each cell in turn to the video stage of the television monitor for a period of $t^L/n$ seconds, where $t^L$ is the line period of the monitor and $n$ the number of infrared detector cells. The resultant image is built up from a large number of discrete "picture" elements.

The sampling rate for the sampling switch is fixed by the number of elements required to form the image and by the frame scanning rate. The latter is limited by the degree of flicker that can be accepted in the reconstituted image. Thus, for an image comprised of 100 by 250 discrete "picture" elements, and with a frame scanning rate of 20 frames per second, the sampling rate would be approximately $10^6$ samples per second, assuming that the back scan of the optical scanner was unused and was of the same duration as the forward scan.

In a system of the above kind, the high speed sampling switch may be composed of M.O.S.T. transistors which effect analogue sampling of the outputs of the infrared detector cells. However, this use of M.O.S.T. transistors limits the sampling rate of the system to around 5 MHz. due to the effects of "on" resistance, shunt capacitance and control signal breakthrough of such transistors at higher switching (sampling) rates.

It is an object of the present invention to provide an arrangement for sampling and multiplexing electrical signals, which can afford a higher sampling rate than 5 MHz.

According to the present invention there is provided an arrangement for sampling and multiplexing electrical signals, in which each signal sample is converted in relation to its amplitude into a time modulated pulse prior to multiplexing.

In carrying out the invention, the time modulated pulses may be of pulse width or pulse position form. In each case, subsequent multiplexing of the time modulated pulses may be effected by means of logic circuitry of known form.

An arrangement in accordance with the invention makes possible an infrared thermal imaging system in which the sampling rate can be such that the "picture" definition, field of view and frame rate are all greater than in a system of the kind referred to which uses M.O.S.T. transistors for analogue sampling. For instance, a sampling rate of $2\times10^7$ samples per second is envisaged, at which rate the sampling period will be 50 nSecs.

Thus, the present invention also provides an infrared thermal imaging system of the kind referred to, in which samples of electrical signals derived from the line array of infrared detector cells and having amplitudes dependent upon the level of infrared radiation to which the respective cells are subjected are converted in relation to their amplitudes into time modulated pulses prior to multiplexing.

In such a system in accordance with the invention, the time modulated pulses may be of pulse width form, in which case they can be applied directly to a cathode-ray tube to modulate its electron beam. Alternatively, the time modulated pulses may be of pulse position form, in which latter case they may be converted to pulse width form for application to a cathode-ray tube, as aforesaid.

In order that the invention may be more fully understood reference will now be made by way of example to the drawings accompanying the Provisional Specification of which:

Figure 1:
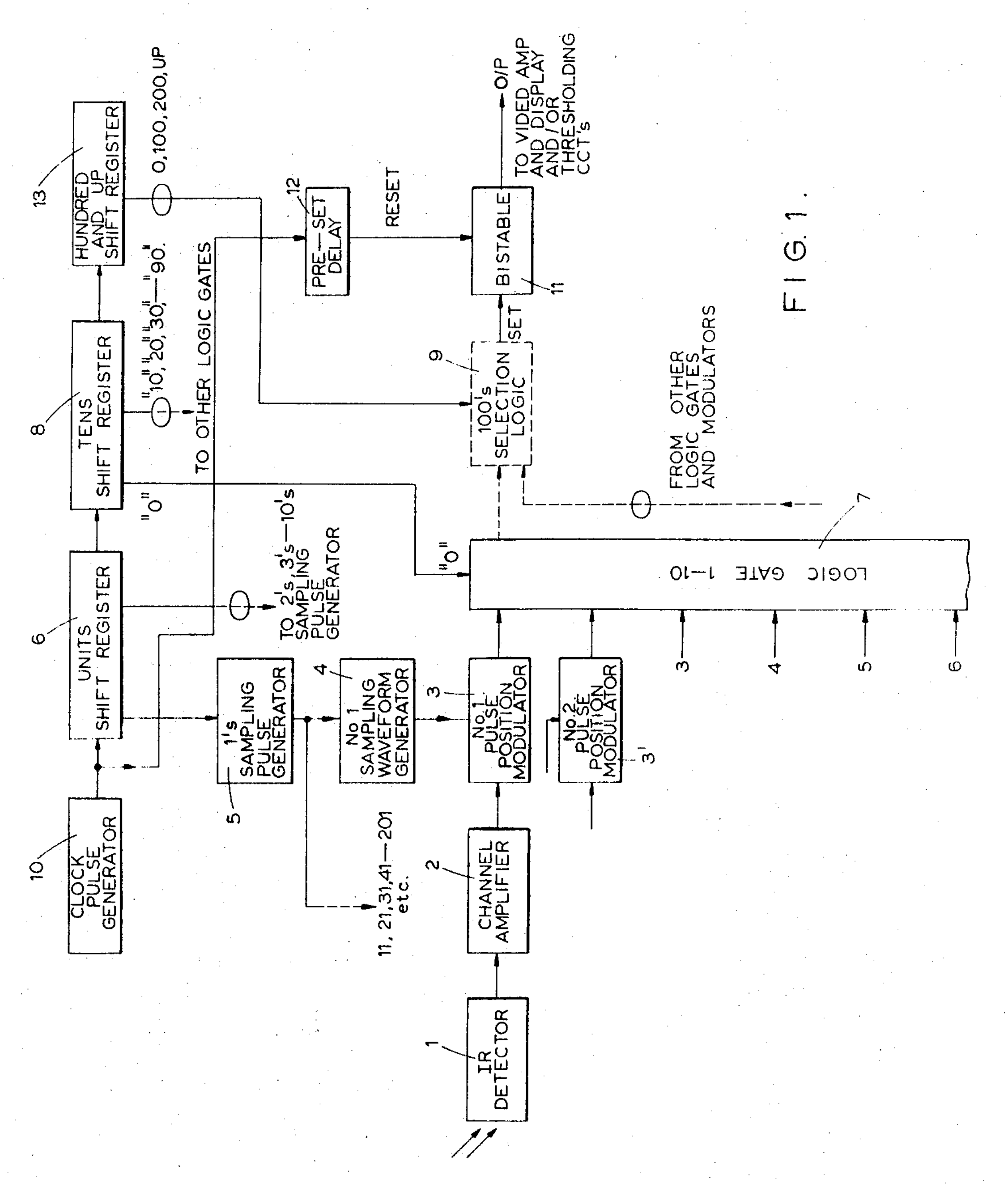
FIG. 1 is a block diagram of a sampling and multiplexing arrangement according to the invention as employed in an infrared imaging system.

In the block schematic diagram shown in FIG. 1, an infrared detector cell 1 is representative of a line array of such cells of an infrared thermal imaging system of the kind referred to. In operation of the system, infrared radiation from a scene is detected by the infrared detector cells 1 and their outputs are amplified by individual channel amplifiers 2. The outputs from the individual channel amplifiers 2 are applied to a like number of pulse position modulators 3. Each modulator 3 is fed from a waveform generator 4 which determines the amplitude/time relationship between the infrared amplitude modulated signal and the output pulse from the modulator 3. Each waveform generator 4 is in turn driven from a sampling pulse generator 5. A number of such waveform generators 4 can be driven in parallel from a single sampling pulse generator 5, say No's 1, 11, 21, 31, 41—201 etc. The sampling pulse generators 5 are gated by a "units" shift register 6. The generators 5 will therefore have a mark-space ratio of 1:10. Thus, channel selection is carried out at the "units" level by means of the sampling pulse generators. The outputs of the pulse position modulators 3, 3' etc., are "fanned-in" by the logic gates. The "tens" group selection is carried out within the logic gate array 7 by means of the "tens" shift register 8, the outputs of which are coupled into respective logic gate arrays. The outputs from all the logic gate arrays are then "-fanned-in" and selected at the 100's level, by the 100's shift register 13, until there is a single multiplexed output conveying all the detected infrared signal information as a series of pulses. These pulses are related sequentially to the information in the incoming infrared channels. Each pulse will be modulated in time, with respect to the leading edge of a clock pulse generated by a clock pulse generator 10, by the detected infrared signal in the relevant channel.

The position modulated pulses (time modulated) coming from the "100's selection logic" 9 are converted into width modulated pulses by means of a bistable circuit 11. This bistable circuit 11 is set to the "0" state by the leading edge of each clock pulse (delayed by a "preset delay" 12) and to the "1" state by the next position modulated pulse coming from the "100's selection logic" 9. The output from the bistable circuit 11 may be inverted by reversing the set and reset connections or by using either the Q or $\overline{Q}$ outputs. The incoming infrared signals are now converted into a series of width modulated pulses.

The "preset delay" 12 that delays the leading edge of each clock pulse is used to compensate for the propagation delay incurred in the modulators, logic gate arrays and associated interconnections.

The width modulated pulses coming from the bistable circuit 11 may, if necessary, be amplified up to a level where each would constitute a peak white signal at the phosphor of a cathode-ray tube. Thus, the width modulated pulses would present a series of picture elements of differing width on the screen of the cathode-ray tube. The overall effect of a picture reproduced in this manner will be similar to that of a newsprint picture. In this way, there is no necessity to demodulate the pulse waveform before applying it to the cathode-ray tube to produce a thermal image, of the scene being scanned.

The intensity of any individual picture element on the screen of the cathode-ray tube is directly related to the output from the sampling and multiplexing arrangement and is not dependent upon the grid-base/luminance characteristic of the cathode-ray tube. There is therefore no need to use linearizing networks in the Z modulation circuitry for the cathode-ray tube. Further, when using Matricons and multigun cathode-ray tubes in thermal imaging systems of the kind referred to, matching and tracking of the grid-base/luminance characteristics is unnecessary. These latter types of cathode-ray tubes are sometimes used to reduce the line frequency as a number of lines may be written in parallel). Any mismatch between the gun characteristics would result in striations on the picture.

In infrared thermal imaging, thermal scenes with contrast ranges of two orders of magnitude frequently occur. Present day semiconductor high speed switches controlling analogue signals can become overloaded and breakthrough may occur when surveying such scenes.

Nonlinear channel amplifiers may be used to compress signals from areas of high contrast, thus preventing overloading and breakthrough in the multiplexing. However, the use of nonlinear amplifiers has disadvantages when used with scenes of low contrast. Complications arise when designing large groups of amplifiers to have switchable nonlinear/linear characteristics and if possible should be avoided.

Figure 2:
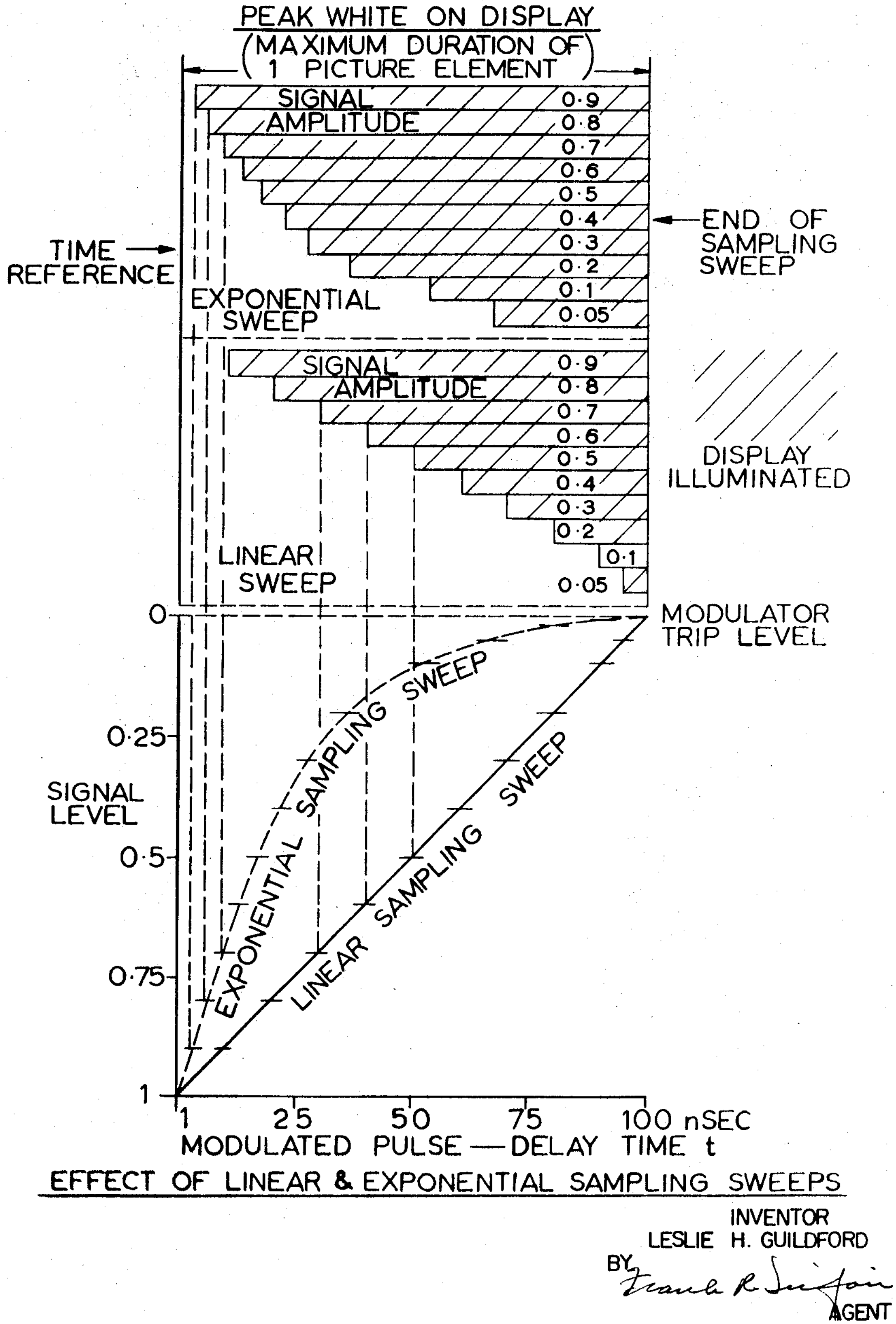
FIG. 2 shows the effect of linear and exponential sampling waveforms in the arrangement of FIG. 1.

However, in an infrared thermal imaging system embodying the present invention there can be a nonlinear relationship between the incoming amplitude modulated signal and the time modulated pulse. This can be achieved by making the output from the "sampling waveform generator" follow an exponential law. Thus high contrast signals will be compressed and low contrast signals expanded within the time scale of say, 100 nSec. as shown diagrammatically in FIG. 2 which is self-explanatory. Thus small signals will be enhanced in scenes of high contrast.

By using a slightly more complicated waveform generator it would be possible to decrease the sweep rate of the "sampling waveform generators" as by means of a switch. Areas of high contrast would then become expanded within the 100 nSec. gated period and low contrast signals would be gated out. Details within areas of high contrast would become visible, as the dynamic range has been increased at the exclusion of the low intensity signals. The result of this is shown diagrammatically in FIG. 3 which is also self-explanatory. The low intensity signals would be gated out by the "logic gates." An extension of this technique would be to extend the duration of the sampling waveform to say 1,000 nSec. and use the 100 nSec. gated period as a movable strobe. The strobe may be centered on any position within the 1,000-nSec. sweep period by means of the "preset delay" control. This control would now be continuously variable. The display would now present an isothermal picture of the scene.

Figure 4:
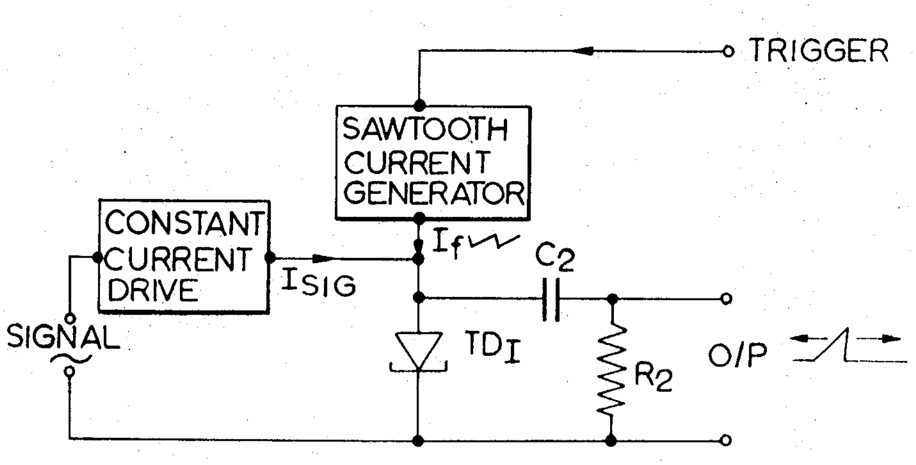
FIG. 4 is a block diagram of a pulse position modulator for use in the arrangement of FIG. 1.

Each pulse position modulator in the arrangement of FIG. 1 may consist of a function generator which may be a sawtooth generator whose output waveform has a known current/time relationship, a current driven threshold detector and a constant current drive for the signal source. Such a modulator is shown in FIG. 4. The tunnel diode $TD_1$ is used as a current mode threshold detector and is triggered "on" when the total current through it exceeds $I_{pk}$, (see FIG. 5). Thus, as the sawtooth current waveform sweeps through $I_{pk}$ the tunnel diode's forward voltage will increase to $\geq V_{valley}$ and a differentiated pulse will appear at the output across resistor $R_2$. The time taken for the output pulse to appear will be related to $I_{pk}$ and the rate of rise of the sawtooth current $I_f$. If additional current is made to flow through the tunnel diode $TD_1$ from the signal source $I_{sig}$, then the time at which $I_{pk}$ is reached will vary with the input signal. Thus the position of a differentiated output pulse across resistor $R_2$ will be related to the amplitude and polarity of the incoming signal.

Figure 3:
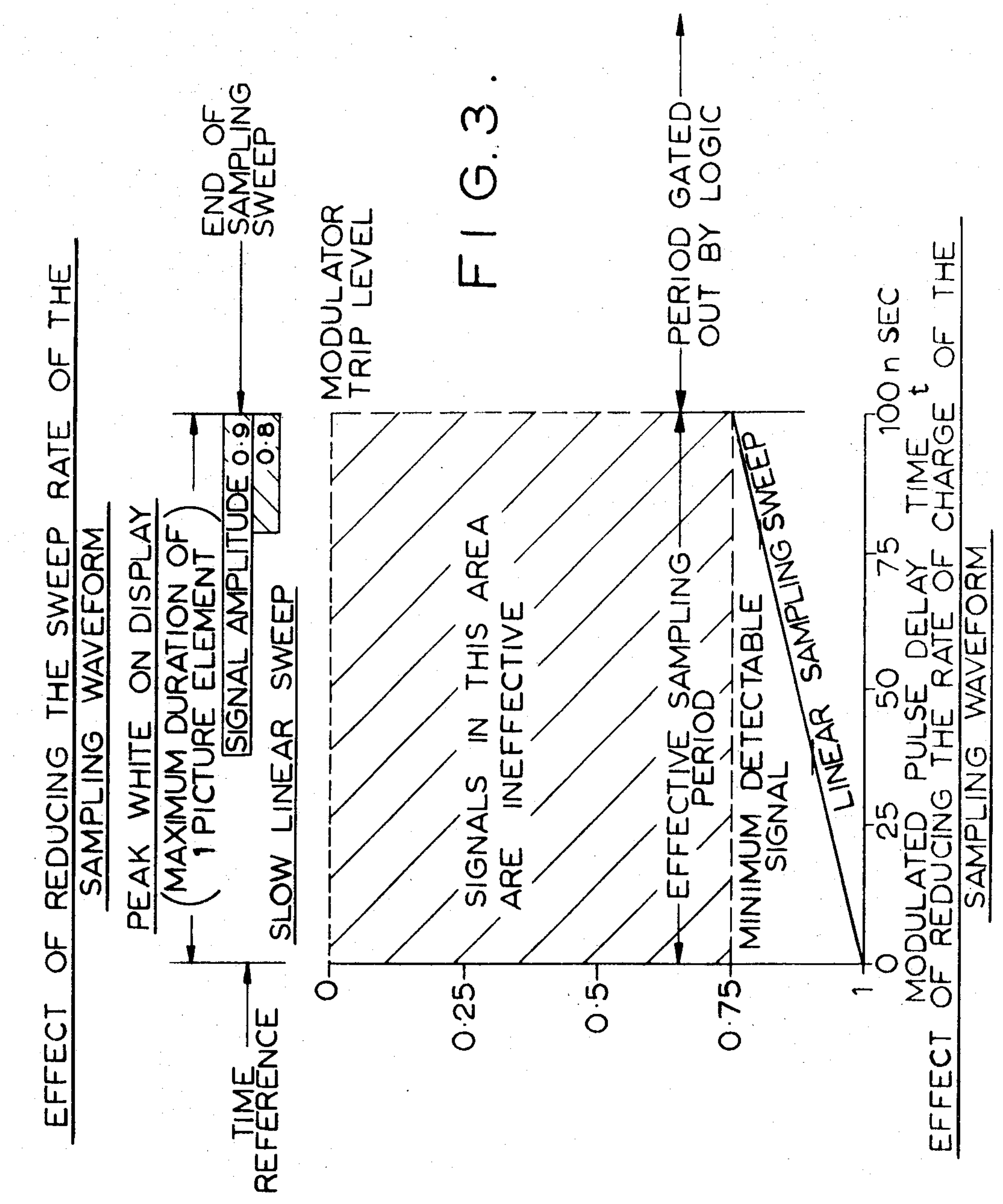
FIG. 3 shows the effect of reducing the sweep rate of the sampling waveforms in the arrangement of FIG. 1.
Figure 5:
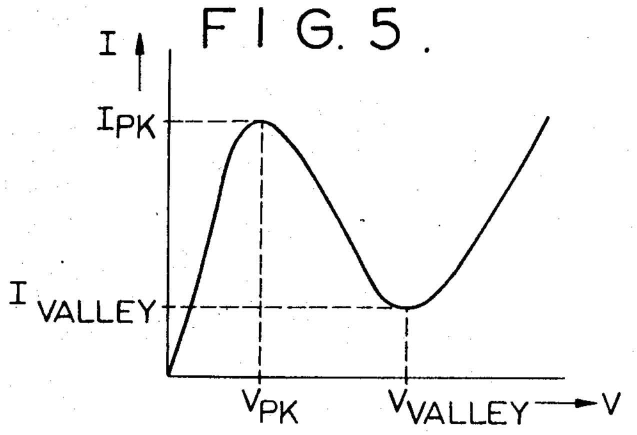
FIG. 5 is a explanatory diagram of the operation of the modulator of FIG. 4.
Figure 6:
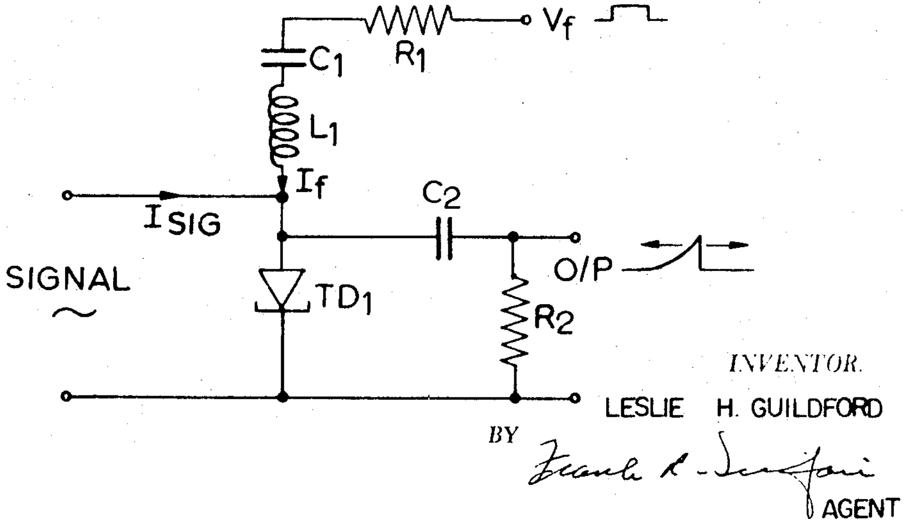
FIG. 6 is a more detailed circuit diagram of that shown in FIG. 4.
Figure 7:
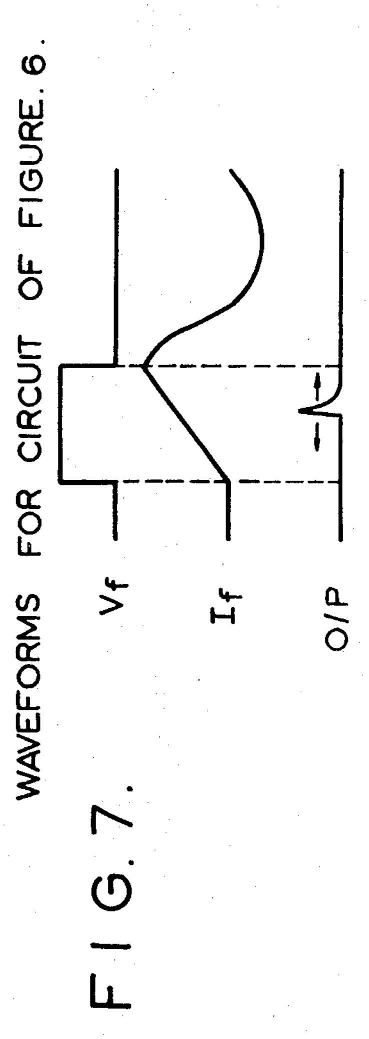
FIG. 7 is an explanatory diagram for the operation of the circuit diagram of FIG. 6.

A more detailed circuit arrangement of a pulse position modulator is shown in FIG. 6: the basic modulator shown above in FIG. 4 does not take account of the need to turn off the tunnel diode $TD_1$ when $I_{sig}$ is greater than $I_{valley}$ as shown in FIG. 5. Referring to FIG. 6, by applying a voltage pulse $V_f$ to $C_1$, $L_1$ and damping resistor $R_1$ a substantially linear sawtooth ramp of current is applied to the tunnel diode $TD_1$. At the termination of the pulse (say after 50 nanoseconds), the energy stored in the circuit $L_1$, $C_1$, $R_1$, creates a current overshoot and turns the tunnel diode "off." For a 50-nanosecond sampling period, $L_1$ would have a value of about 7 microhenries and the maximum repetition rate would be 250 nanoseconds due to the resetting operation. Thus five separate pulse generators would be required to continuously sample a system at 50-nanosecond periods. FIG. 7 shows waveforms for the circuit of FIG. 6. By making the time constant of $L_1$ and $R_1$ greater than the sampling period a linear sampling sweep is achieved, If the time constant is appreciably greater, for instance it approximates to the line period of the system, then sampling at a reduced sweep rate as illustrated in FIG. 3 would be achieved. If the time constant of $L_1$ and $R_1$ is made less than the sampling period, then an exponential sampling sweep is achieved. Copending application Ser. Nos. 14772/67 and 14773/67 (PHB 31,733 and PHB 31,734) relate to pulse width modulator circuits. The first-mentioned application corresponds to U.S. Pat. application Ser. No. 715,755, filed on Mar. 25, 1968.

Figure 8:
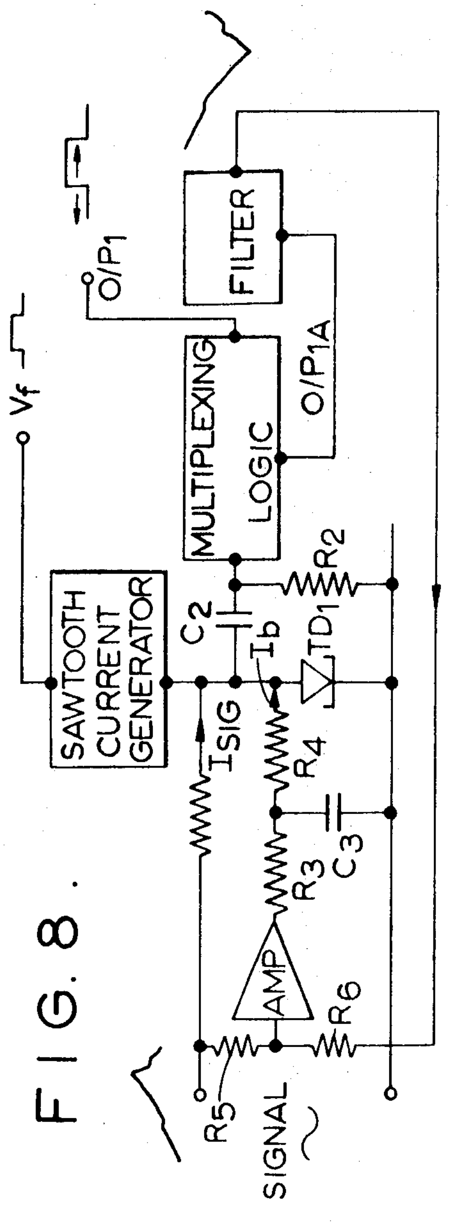
FIG. 8 is a modification of the modulator of FIG. 4.

FIG. 8 shows an arrangement for improving the linearity and matching between modulators. This arrangement is similar to the modulator shown in FIG. 4 but includes a "-filter," and a "multiplexing logic" block which represents a complete multiplexing arrangement of the form shown in FIG. 1. By filtering the output $O/P_{1A}$ the waveform of the original signal may be reconstituted. This reconstituted signal waveform is compared with the original signal waveform in an adding network, one signal being inverted and the amplified difference between the signals being applied as a correcting bias current $I_b$ via $R_3$ and $R_4$. With this circuit the filters must be identical within each group; then $R_5$ and $R_6$ determine the ratio of $V_{sig}$ to $V_{out}$.

What I claim is:

1. A circuit for processing amplitude modulated signals from a plurality of sources for visual display thereof comprising means for converting each of said amplitude modulated signals into time modulated signals, means for sampling each of said time modulated signals, and means for multiplexing said sampled time modulated signals to permit more effective display thereof.

2. A circuit as claimed in claim 1 wherein each of said converting means comprises a pulse position modulator.

3. A circuit as claimed in claim 2 further comprising a plurality of sampling waveform generators coupled to each of said converting means respectively.

4. A circuit as claimed in claim 3 wherein each of said generators provides a linear sampling signal.

5. A circuit as claimed in claim 3 wherein each of said generator provides an exponential sampling signal.

6. A circuit as claimed in claim 3 wherein each of said sampling generators provides a reduced sweep corresponding to only a selected portion of the amplitude of said amplitude modulated signals.

7. A circuit as claimed in claim 2 wherein each of said pulse position modulators comprises a tunnel diode, a constant current drive circuit coupled to said diode, a sawtooth current generator coupled to said diode, and a differentiating circuit coupled to said diode.

8. A circuit as claimed in claim 1 wherein said time modulator comprises a pulse width modulator.

9. A circuit as claimed in claim 1 further comprising means for displaying said time modulated signal.

10. A circuit as claimed in claim 1 wherein each of said amplitude modulated signal sources comprises a plurality of infrared detectors arranged in a matrix.